United States Patent
Kikuchi et al.

(10) Patent No.: US 10,017,836 B2
(45) Date of Patent: Jul. 10, 2018

(54) METHOD FOR PRODUCING REDUCED IRON

(71) Applicant: Kobe Steel, Ltd., Kobe-shi (JP)

(72) Inventors: Shoichi Kikuchi, Kobe (JP); Tsuyoshi Mimura, Kobe (JP); Takao Harada, Kobe (JP); Shingo Yoshida, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 135 days.

(21) Appl. No.: 14/650,376

(22) PCT Filed: Jan. 30, 2014

(86) PCT No.: PCT/JP2014/052050
§ 371 (c)(1),
(2) Date: Jun. 8, 2015

(87) PCT Pub. No.: WO2014/119647
PCT Pub. Date: Aug. 7, 2014

(65) Prior Publication Data
US 2015/0322542 A1   Nov. 12, 2015

(30) Foreign Application Priority Data
Feb. 1, 2013  (JP) ................................ 2013-018890

(51) Int. Cl.
| C21B 13/10 | (2006.01) |
| C22B 7/02 | (2006.01) |
| C22B 5/10 | (2006.01) |
| C22B 1/24 | (2006.01) |
| C21B 13/00 | (2006.01) |
| C22B 1/245 | (2006.01) |

(52) U.S. Cl.
CPC ............ *C22B 7/02* (2013.01); *C21B 13/0046* (2013.01); *C21B 13/105* (2013.01); *C22B 1/24* (2013.01); *C22B 1/245* (2013.01); *C22B 5/10* (2013.01); *Y02P 10/216* (2015.11)

(58) Field of Classification Search
None
See application file for complete search history.

(56) References Cited

U.S. PATENT DOCUMENTS

| 3,953,196 A * | 4/1976 | Obenchain .......... C21B 13/0046 75/10.15 |
| 6,036,744 A | 3/2000 | Negami et al. |
| 6,039,744 A * | 3/2000 | Forber ..................... A61F 2/95 606/108 |
| 7,384,450 B2 * | 6/2008 | Kikuchi .............. C21B 13/0066 75/484 |
| 2001/0037703 A1 * | 11/2001 | Fuji ........................ C21B 13/10 75/483 |
| 2003/0188603 A1 | 10/2003 | Maki et al. |
| 2010/0171072 A1 | 7/2010 | Kudo et al. |
| 2015/0027275 A1 * | 1/2015 | Kikuchi .............. C21B 13/0046 75/484 |

FOREIGN PATENT DOCUMENTS

| CN | 1443856 A | 9/2003 |
| JP | 11 92833 | 4/1999 |
| JP | 2003 73722 | 3/2003 |
| JP | 2003 293019 | 10/2003 |
| JP | 2012 144788 | 8/2012 |
| WO | 2009 001663 | 12/2008 |

OTHER PUBLICATIONS

International Search Report and Written Opinion of the International Searching Authority dated Apr. 28, 2014 in PCT/JP2014/052050 Filed Jan. 30, 2014.

* cited by examiner

*Primary Examiner* — George Wyszomierski
(74) *Attorney, Agent, or Firm* — Oblon, McClelland, Maier & Neustadt, L.L.P.

(57) ABSTRACT

Provided is a technique for increasing the yield of reduced iron, thereby improving productivity when manufacturing reduced iron by heating an agglomerate.
This method for manufacturing reduced iron includes: a step in which a mixture is agglomerated, said mixture containing an iron oxide-containing substance, a carbonaceous reducing agent, and a melting point regulator; and a step in which reduced iron is manufactured by heating the obtained agglomerate, reducing and partially melting the iron oxide in the agglomerate, and aggregating the iron component. The particle size of the fine particulate iron generated in the step in which the reduced iron is manufactured is adjusted, and the fine particulate iron is blended into the mixture.

7 Claims, No Drawings

METHOD FOR PRODUCING REDUCED IRON

TECHNICAL FIELD

The present invention relates to a method for producing reduced iron by heating an iron oxide-containing substance, such as iron ore and steel mill waste dust, and agglomerates containing a carbonaceous reducing agent, such as a carbon material.

BACKGROUND ART

In the case of producing reduced iron by the reduction of iron oxide contained in iron ore, a process for producing reduced iron with relatively easily available coal that serves as a carbonaceous reducing agent for the reduction of iron ore have been receiving attention. In the process for producing reduced iron, agglomerates that contains an iron oxide-containing substance, a carbonaceous reducing agent, and a melting point-adjusting agent are charged into a movable hearth type heating furnace, such as a rotary hearth furnace, and heated by gas heat transfer and radiation heat with a heating burner in the furnace to reduce iron oxide, thereby producing agglomerate reduced iron. The process for producing reduced iron has the following advantages: in addition to the coal basis, powdery iron ore can be directly used; iron oxide in iron ore can be rapidly reduced during reduction because iron ore and the reducing agent are juxtaposed to each other; a large-scale facility, such as a blast furnace, is not required; and coke is not required.

As the foregoing process for producing reduced iron, the applicants propose a technique described in PTL 1. The technique is one in which a raw material that contains a metal oxide-containing substance and a carbonaceous reducing agent is heated to reduce the metal oxide in the raw material and in which the resulting metal is further heated so as to be melted while allowing the metal to separate from a by-product slag component and allowing the by-product slag to coalesce, in which a coalescence-promoting agent for the by-product slag is mixed with the raw material. The mixing of the coalescence-promoting agent for the by-product slag promotes the separation of the resulting molten metal from the by-product slag, thereby producing a high-purity granular metal having a relatively large size, and a uniform particle diameter with high productivity in satisfactory yield. It is disclosed that calcium fluoride ($CaF_2$) serving as the coalescence-promoting agent for the by-product slag is mixed.

CITATION LIST

Patent Literature

PTL 1: Japanese Unexamined Patent Application Publication No. 2003-73722

SUMMARY OF INVENTION

Technical Problem

While the technique disclosed in PTL 1 improves the productivity of the granular metal, further improvement in productivity is required.

The present invention has been accomplished in light of the foregoing circumstances. It is an object of the present invention to provide a method for producing reduced iron by heating agglomerates, in which the method provides a high yield of the reduced iron to improve the productivity.

Solution to Problem

A method for producing reduced iron according to the present invention that solves the foregoing problems includes a step of agglomerating a mixture that contains an iron oxide-containing substance, a carbonaceous reducing agent, and a melting point-adjusting agent; and a step of producing reduced iron by heating the resulting agglomerates, reducing and partially melting iron oxide in the agglomerates, and allowing an iron component to coalesce, in which the particle diameter of fine particle iron formed in the step of producing reduced iron is adjusted, and the fine particle iron is blended with the mixture.

As the fine particle iron whose particle diameter has been adjusted, for example, the fine particle iron that satisfies the requirement that the particle diameter be 3 mm or less is preferably used. The fine particle iron may be subjected to classification to adjust the particle diameter. The fine particle iron may be subjected to pulverization and then classification to adjust the particle diameter. The fine particle iron may be subjected to pulverization to adjust the particle diameter. As the fine particle iron, for example, the fine particle iron that satisfies the requirements that the total iron content (Total Fe) be 50% by mass or more and that the specific gravity be 4 $g/cm^3$ or more may be used. When the mass of the mixture other than the fine particle iron is defined as 100%, the fine particle iron is preferably blended with the mixture in an amount of 3% by mass or more.

Advantageous Effects of Invention

According to the present invention, the fine particle iron which is formed in the step of producing reduced iron and which has an adjusted particle diameter is blended with the mixture serving as a raw material of the agglomerates, thus increasing the apparent density of the agglomerates and increasing the iron content in the agglomerates. This improves the yield of reduced iron formed when the agglomerates are heated, thereby enhancing the productivity.

DESCRIPTION OF EMBODIMENTS

The inventors have conducted intensive studies in order to improve the yield of reduced iron to enhance the productivity when the reduced iron is produced by agglomerating a mixture containing an iron oxide-containing substance, a carbonaceous reducing agent, and a melting point-adjusting agent to form agglomerates and heating the resulting agglomerates, and have found the following: In the case where the particle diameter of fine particle iron formed in the step of producing reduced iron is adjusted and where the fine particle iron is blended with the mixture, the agglomerates have an increased apparent density and an increased iron content. Heating the agglomerates promotes the coalescence of reduced iron to form coarse reduced iron. This improves the yield of the reduced iron to enhance the productivity. The findings have led to the completion of the present invention.

The blending of the fine particle iron that characterizes the present invention will be described.

In the present invention, after the particle diameter of the fine particle iron formed in the step of producing reduced iron is adjusted, the fine particle iron is blended with the mixture to be formed into the agglomerates. The blending of the fine particle iron increases the apparent density of the agglomerates, thereby allowing a reduction reaction to proceed rapidly, promoting the coalescence of the reduced iron, and easily forming coarse reduced iron. Furthermore, the blending of the fine particle iron enables the iron content of the agglomerates to increase, thereby increasing the amount of reduced iron formed and easily forming coarse reduced iron. The coarse reduced iron is easily recovered by sifting or magnetic separation, thus resulting in a satisfactory yield of the reduced iron and improvement in productivity.

When reduced iron is produced by heating agglomerates, fine particle iron having a particle diameter of 5 mm or less is formed, the fine particle iron being not used as a product, in addition to coarse reduced iron that may be used as a product. Hitherto, such fine particle iron has been charged into, for example, a briquetting machine, and formed into briquettes, and the resulting briquettes have been used as an iron source, like the foregoing coarse reduced iron. In contrast, in the present invention, the fine particle iron is used as a raw material for agglomerates. The fine particle iron has been already reduced and thus has almost no effect on the reaction time of reduced iron, so that the fine particle iron contributes to an increase in the size of the reduced iron and improves the yield of the reduced iron, thereby improving the productivity.

Regarding the fine particle iron, the fine particle iron whose particle diameter has been adjusted is required to be blended with the mixture. The fine particle iron may be blended with the mixture while the particle diameter is adjusted to a predetermined range. Alternatively, after the particle diameter is adjusted to a predetermined range, the fine particle iron may be blended with the mixture.

The fine particle iron blended with the mixture is preferably adjusted so as to have a particle diameter of 3 mm or less. Particle iron having a particle diameter more than 3 mm has a high iron content and thus may be treated as a semi-product. Thus, in the case of producing reduced iron using the mixture blended with such particle iron having a large particle diameter, it is a waste of energy. In the case where the particle iron having a particle diameter more than 3 mm is blended with the mixture, segregation can occur, resulting in nonuniform agglomerates formed by agglomeration. In contrast, in the case where the fine particle iron whose particle diameter has been adjusted to 3 mm or less is blended with the mixture, the iron component is recovered, producing reduced iron. As the fine particle iron, the fine particle iron that satisfies the requirement that the particle diameter be 1 mm or less is more preferably used. A particle diameter of 1 mm or less results in a further increase in the apparent density of the agglomerates, thus improving the productivity of the reduced iron. The particle diameter is more preferably 0.8 mm or less, particularly preferably 0.5 mm or less, and most preferably 0.3 mm or less. The lower limit of the particle diameter is not particularly limited and does not include 0 mm.

The particle diameter of the fine particle iron may be adjusted by pulverizing fine particle iron formed in the step of producing reduced iron or may be adjusted by sifting fine particle iron formed in the step of producing reduced iron and collecting only fine particle iron having a small particle diameter. Alternatively, the particle diameter may be adjusted by pulverizing fine particle iron formed in the step of producing reduced iron and then performing classification.

As the fine particle iron, when the component composition of fine particle iron is analyzed, the fine particle iron that satisfies the requirements that the total iron content (Total Fe) be 50% by mass or more and that the specific gravity be 4 g/cm$^3$ or more is preferably used.

A total iron content of 50% by mass or more results in an increase in the iron content of the agglomerates, thereby improving the productivity of the reduced iron. The total iron content is more preferably 60% by mass or more.

A specific gravity of 4 g/cm$^3$ or more results in an increase in the apparent density of the agglomerates, thereby improving the productivity of the reduced iron. The specific gravity is more preferably 4.5 g/cm$^3$ or more.

The fine particle iron is preferably blended in an amount of 3% by mass or more when the mass of the mixture other than the fine particle iron is defined as 100%. When the amount of the fine particle iron blended is 3% by mass or more, the productivity of the reduced iron is sufficiently increased because of a sufficient increase in the apparent density of the agglomerates and a sufficient increase in the iron content of the agglomerates. The amount of the fine particle iron blended is more preferably 5% by mass or more and still more preferably 10% by mass or more.

The blending of the fine particle iron that characterizes the present invention has been described above.

A method for producing reduced iron according to the present invention will be described below.

A method for producing reduced iron according to the present invention includes:
  a step of agglomerating a mixture that contains an iron oxide-containing substance, a carbonaceous reducing agent, and a melting point-adjusting agent (hereinafter, also referred to as an "agglomeration step"); and
  a step of producing reduced iron by heating the resulting agglomerates, reducing and partially melting iron oxide in the agglomerates, and allowing an iron component to coalesce (hereinafter, also referred to as a "heating step"),
  in which the particle diameter of fine particle iron formed in the step of producing reduced iron is adjusted, and the fine particle iron is blended with the mixture, as described above.

[Agglomeration Step]

In the agglomeration step, the mixture that contains the iron oxide-containing substance, the carbonaceous reducing agent, and the melting point-adjusting agent is agglomerated to produce the agglomerates.

Specific examples of iron oxide-containing substance that may be used as the iron oxide-containing substance include iron ore, iron sand, steel mill waste dust, residues resulting from non-ferrous smelting, and waste products resulting from steel production.

As the carbonaceous reducing agent, for example, coal and coke may be used.

The carbonaceous reducing agent may contain carbon in an amount required to reduce iron oxide in the iron oxide-containing substance. Specifically, the carbonaceous reducing agent may contain carbon in an amount that is 0% to 5% by mass larger or 0% to 5% by mass smaller than the amount of carbon required to reduce iron oxide in the iron oxide-containing substance. That is, the carbonaceous reducing agent may contain carbon in an amount that is in the range of −5% to +5% by mass with respect to the amount of carbon required to reduce iron oxide in the iron oxide-containing substance.

The melting point-adjusting agent refers to a substance having the effects of lowering the melting point of gangue in the iron oxide-containing substance and the melting point of ash in the carbonaceous reducing agent. That is, the blending of the melting point-adjusting agent with the iron oxide-containing substance and the carbonaceous reducing agent affects the melting point of a component (in particular, gangue) other than iron oxide in the agglomerates and, for example, lowers the melting point. This promotes the melting of gangue, forming molten slag.

As the melting point-adjusting agent, for example, at least one selected from the group consisting of a CaO feed substance, a MgO feed substance, an $Al_2O_3$ feed substance, a $SiO_2$ feed substance, and fluorite ($CaF_2$) may be used.

As the CaO feed substance, for example, at least one selected from the group consisting of quicklime (CaO), hydrated lime [$Ca(OH)_2$], limestone ($CaCO_3$), and dolomite [$CaMg(CO_3)_2$] may be used. As the MgO feed substance, for example, at least one selected from the group consisting of dolomite, MgO powder, Mg-containing substances extracted from natural ore, seawater, and so forth, and $MgCO_3$ may be used. As the $Al_2O_3$ feed substance, for example, at least one selected from the group consisting of $Al_2O_3$ powder, bauxite, boehmite, gibbsite, and diaspore may be used. As the $SiO_2$ feed substance, for example, $SiO_2$ powder, silica sand, and so forth may be used.

Regarding the agglomerates according to the present invention, the mixture that contains the iron oxide-containing substance, the carbonaceous reducing agent, the melting point-adjusting agent is required to be blended with the fine particle iron whose particle diameter has been adjusted, as described above.

In the present invention, a binder or the like may be further blended as a component other than the iron oxide-containing substance, the carbonaceous reducing agent, the melting point-adjusting agent, and the fine particle iron.

As the binder, for example, a polysaccharide or the like may be used. Examples of the polysaccharide include starch, such as cornstarch and flour.

Each of the iron oxide-containing substance, the carbonaceous reducing agent, and the melting point-adjusting agent is preferably pulverized before blending. The pulverization is preferably performed in such a manner that, for example, the iron oxide-containing substance has a mean particle diameter of 10 to 60 µm, the carbonaceous reducing agent has a mean particle diameter of 10 to 60 µm, and the melting point-adjusting agent has a mean particle diameter of 10 to 60 µm. The particle diameter of the fine particle iron may be adjusted to, for example, 3 mm or less before blending, as described above.

A means of the pulverization is not particularly limited. A known means may be used. For example, a vibration mill, a roll crusher, a ball mill, or the like may be used.

The foregoing raw materials are mixed with a rotary-vessel-type mixer or a fixed-vessel-type mixer. Examples of the rotary-vessel-type mixer include rotary-cylinder-type, double-cone-type, and V-type mixers. An example of the fixed-vessel-type mixer is a mixer equipped with rotary blades, such as a spade, in a mixing chamber. However, the type of mixer is not particularly limited thereto.

As an agglomerator configured to agglomerate the mixture, for example, a rotating disc pelletizer (disc-type pelletizer), a cylindrical pelletizer (drum-shaped pelletizer), a double-roll briquetting machine, or the like may be used.

The shape of the agglomerates is not particularly limited. The shaping may be performed by pelletization, briquetting, or extrusion.

[Heating Step]

In the heating step, the agglomerates formed in the agglomeration step is heated, iron oxide in the agglomerates is reduced and partially melted, and the iron component is allowed to coalesce, thereby producing reduced iron.

The heating of the agglomerates may be performed with, for example, an electric furnace or a movable hearth type heating furnace. The movable hearth type heating furnace refers to a heating furnace in which a hearth is moved in the furnace, like a conveyor belt. Examples thereof include a rotary hearth furnace and a tunnel furnace.

In the rotary hearth furnace, the appearance of the hearth is designed to have a circular shape or a doughnut shape in such a manner that the start point and the end point of the hearth are located at the same position. Iron oxide in the agglomerates charged onto the hearth is reduced by heating to form reduced iron while the agglomerates make a circuit in the furnace. Thus, the rotary hearth furnace is equipped with a charging means for charging the agglomerates into the furnace at the upstream end in the direction of rotation and a discharging means at the downstream end in the direction of rotation. That is, since the rotary hearth furnace has a rotational structure, in fact, the downstream end is located immediately upstream of the charging means. The tunnel furnace refers to a heating furnace in which a hearth moves linearly in the furnace.

The agglomerates are preferably reduced by heating at 1300° C. to 1500° C. At a heating temperature lower than 1300° C., reduced iron and slag may not be easily melted, failing to achieve high productivity. Thus, the heating temperature is preferably 1300° C. or higher and more preferably 1400° C. or higher. A heating temperature higher than 1500° C. results in a high exhaust gas temperature. This requires large-scale equipment for exhaust gas treatment, increasing equipment costs. Thus, the heating temperature is preferably 1500° C. or lower and more preferably 1480° C. or lower.

A hearth covering material is preferably placed for the protection of the hearth before the charging of the agglomerates into the electric furnace or the movable hearth type heating furnace.

Examples of the hearth covering material that may be used include refractory particles of refractory ceramics and so forth in addition to materials exemplified as the carbonaceous reducing agent.

The hearth covering material preferably has a particle diameter of 3 mm or less in such a manner that the agglomerates and melt thereof do not penetrate. The lower limit of the particle diameter is preferably 0.4 mm or more in such a manner that the hearth covering material is not blown by a combustion gas from a burner.

[Others]

The reduced iron produced in the heating step may be recovered by discharging the reduced iron from the furnace together with, for example, by-product slag and the hearth covering material placed as needed and screening the resulting mixture with, for example, a sieve or a magnetic separator.

This application claims the benefit of priority of Japanese Patent Application No. 2013-018890 filed Feb. 1, 2013. Japanese Patent Application No. 2013-018890 is hereby incorporated by reference herein in its entirety.

The present invention will now be further described in detail with reference to examples, but it should be understood that the examples are not intended to limit the present invention. Any modification in the range of the purpose described above or below is within the technical scope of the present invention.

EXAMPLES

[Preliminary Experiment]

The inventors performed preliminary experiments described below. Specifically, dry pellets which did not contain fine particle iron and which contained an iron oxide-containing substance, a carbonaceous reducing agent, a melting point-adjusting agent, and a binder were heated with a heating furnace to produce reduced iron. At this time, a powder that was not recovered as a product was classified with a sieve or was pulverized and then classified with a sieve. A powder passing through the sieve was recovered as fine particle iron. The recovered fine particle iron was reused as a raw material for the dry pellets, and the reduced iron was produced. At this time, the recovery ratio of the reduced iron recovered as a product was calculated.

(Preliminary Experiment 1: Case of Classification with Sieve)

Dry pellets which did not contain fine particle iron and which contained an iron oxide-containing substance, a carbonaceous reducing agent, a melting point-adjusting agent, and a binder were charged into a heating furnace and heated. The amount of the dry pellets charged into the heating furnace was defined as 100 parts by mass. After the resulting mixture discharged from the heating furnace was subjected to magnetic separation to remove slag, the resulting iron was classified using a sieve with 5-mm openings. The resulting oversieve residues that did not pass through the sieve were recovered as reduced iron (product). As a result, 45.8 parts by mass of the reduced iron was recovered as a product.

A powder which passed through the sieve with 5-mm openings and which was subjected to magnetic separation to remove the slag was obtained in an amount of 4.2 parts by mass. The particle diameter distribution of the powder passed through the sieve with 5-mm openings was measured. Table 1 lists the results. The iron content (Total Fe (% by mass)) of the powder was measured in each particle diameter range. Table 1 also lists the results. In Table 1, "+4.75" listed in the "Particle diameter" column indicates a powder which does not pass through a sieve with 4.75-mm openings and is left on the sieve when sifting is performed with the sieve. Furthermore, "−1.0" indicates a powder that passes through a sieve with 1.0-mm openings when sifting is performed with the sieve.

The powder that had passed through the sieve with 5-mm openings was sifted using a sieve with 2.36-mm openings as a classifier. The results demonstrated that the resulting oversieve residues that did not pass through the sieve with 2.36-mm openings were obtained in an amount of 1.2 parts by mass and that the resulting powder passed through the sieve was obtained in an amount of 3.0 parts by mass.

The iron content (Total Fe (% by mass)) of the oversieve residues that had not passed through the sieve with 2.36-mm openings was measured and found to be 83% by mass. The results revealed that the oversieve residues were usable as a semi-product.

An attempt was made to blend the powder passed through the sieve with 2.36-mm openings as fine particle iron with the dry pellets. Specifically, the total of the iron oxide-containing substance, the carbonaceous reducing agent, the melting point-adjusting agent, and the binder was defined as 100 parts by mass. The fine particle iron was blended therewith, and then dry pellets were produced. Then 103.0 parts by mass of the dry pellets were charged into the heating furnace and heated. Reduced iron recovered as a product was obtained in an amount of 47.9 parts by mass. The results demonstrated that it was possible to increase the production by 2.1 parts by mass, compared with the case where the fine particle iron was not blended.

Here, when 100 parts by mass of the dry pellets free from the fine particle iron were charged into the heating furnace, 45.8 parts by mass of the reduced iron was obtained. In this case, the recovery ratio of the reduced iron was 45.8%. In contrast, when 103.0 parts by mass of the dry pellets containing the fine particle iron were charged into the heating furnace, 47.9 parts by mass of the reduced iron was obtained. In this case, the recovery ratio of the reduced iron was 46.5%. The results demonstrated that it was possible to improve the recovery ratio of the product by reusing the fine particle iron formed in the step of producing reduced iron.

(Preliminary Experiment 2: Case of Classification with Sieve after Pulverization)

In the same way as in preliminary experiment 1 described above, 100 parts by mass of dry pellets which did not contain fine particle iron and which contained an iron oxide-containing substance, a carbonaceous reducing agent, a melting point-adjusting agent, and a binder were charged into a heating furnace and heated. In this case, 45.8 parts by mass of reduced iron was recovered as a product.

A powder which passed through the sieve with 5-mm openings and which was subjected to magnetic separation to remove the slag was obtained in an amount of 4.2 parts by mass, which is the same value as in preliminary experiment 1. The results of the particle diameter distribution of the powder passed through the sieve with 5-mm openings and the iron content (Total Fe (% by mass)) of the powder in each particle diameter range were the same as in preliminary experiment 1 (see Table 1).

A powder that had passed through the sieve with 5-mm openings was fed to a pulverizer and pulverized. The resulting pulverized powder was sifted using a sieve with 2.36-mm openings as a classifier. The results demonstrated that the resulting oversieve residues that did not pass through the sieve with 2.36-mm openings were obtained in an amount of 1.1 parts by mass and that the resulting powder passed through the sieve was obtained in an amount of 3.1 parts by mass.

The iron content (Total Fe (% by mass)) of the oversieve residues that had not passed through the sieve with 2.36-mm openings was measured and found to be 90% by mass. The results revealed that the oversieve residues were usable as a semi-product.

An attempt was made to blend the powder passed through the sieve with 2.36-mm openings as fine particle iron with the dry pellets. Specifically, the total of the iron oxide-containing substance, the carbonaceous reducing agent, the melting point-adjusting agent, and the binder was defined as 100 parts by mass. The fine particle iron was blended therewith, and then dry pellets were produced. Then 103.1 parts by mass of the dry pellets were charged into the heating furnace and heated. Reduced iron recovered as a product was obtained in an amount of 47.9 parts by mass. The results demonstrated that it was possible to increase the production by 2.1 parts by mass, compared with the case where the fine particle iron was not blended.

Here, when 100 parts by mass of the dry pellets free from the fine particle iron were charged into the heating furnace, 45.8 parts by mass of the reduced iron was obtained. Thus, the recovery ratio of the reduced iron was 45.8%. In contrast, when 103.1 parts by mass of the dry pellets containing the fine particle iron were charged into the heating furnace, 47.9 parts by mass of the reduced iron was obtained. Thus, the recovery ratio of the reduced iron was 46.5%. The results demonstrated that it was possible to improve the recovery ratio of the product by reusing the fine particle iron formed in the step of producing reduced iron.

A comparison between the results of preliminary experiments 1 and 2 demonstrated that in preliminary experiment 2 in which the pulverizer was provided upstream of the classifier, a higher iron content of the oversieve residues that did not pass through the sieve with 2.36-mm openings was obtained.

TABLE 1

Fine particle iron

| Particle diameter (mm) | Particle diameter distribution (% by mass) | Total Fe (% by mass) |
|---|---|---|
| +4.75 | 4.65 | 89.27 |
| 3.35-4.75 | 11.97 | 87.84 |
| 2.36-3.35 | 12.09 | 75.84 |
| 1.70-2.36 | 8.32 | 72.17 |
| 1.0-1.70 | 11.05 | 68.73 |
| −1.0 | 51.91 | 75.25 |
| +2.36 | 28.71 | 82.99 |
| −2.66 | 71.29 | 73.88 |
| Total | | 76.50 |

[Experimental Example 1]

A mixture that contained an iron oxide-containing substance, a carbonaceous reducing agent, a melting point-adjusting agent, and a binder was agglomerated to produce agglomerates. As the iron oxide-containing substance, iron ore having a component composition listed in Table 2 described below was used. In Table 2, "Total Fe" indicates the total iron content. As the carbonaceous reducing agent, coal having a component composition listed in Table 3 described below was used. As the melting point-adjusting agent, limestone having a component composition listed in Table 4 described below, dolomite having a component composition listed in Table 5 described below, and fluorite having a component composition listed in Table 6 described below were used. In Table 6, "Total Ca" indicates the total calcium content.

Regarding No. 1 listed in Table 10 described below, the iron oxide-containing substance (iron ore), the carbonaceous reducing agent (coal), the melting point-adjusting agent (limestone, dolomite, and fluorite), and flour as the binder were blended together in a blending ratio listed in Table 7 described below. An appropriate amount of water was added thereto. Green pellets each having a diameter of 19 mm were produced with a tire-type pelletizer.

Regarding each of Nos. 2 to 5 listed in Table 10, the iron oxide-containing substance (iron ore), the carbonaceous reducing agent (coal), the melting point-adjusting agent (limestone, dolomite, and fluorite), and flour as the binder were blended together in a blending ratio listed in Table 7 described below. The amount of the resulting mixture was defined as 100% by mass. Fine particle iron listed in Table 10 and an appropriate amount of water were added thereto. Green pellets each having an average diameter of 19 mm were produced with a tire-type pelletizer.

The foregoing fine particle iron was as follows: Prepared fine particle iron (specifically, fine particle iron formed in the step of producing reduced iron, the fine particle iron being unpulverized) was sifted using a sieve with 2.36-mm openings. A portion of the powder passed through the sieve was collected. The resulting undersieve was sifted using a sieve with 1.7-mm openings and a sieve with 1.0-mm openings, and the particle diameter distribution was determined. Table 8 lists the particle diameter distribution. In Table 8, "−1.0" listed in the "Particle diameter" column indicates a powder that passes through a sieve with 1.0-mm openings when sifting is performed with the sieve.

The component composition of the prepared fine particle iron is listed in Table 9 described below. In Table 9, "Total Fe" indicates the total iron content, "Met. Fe" indicates the metallic iron content, and "Total C" indicates the total carbon content. The prepared fine particle iron had a specific gravity of 4.7 g/cm$^3$.

Regarding each of Nos. 2 to 5 listed in Table 10 described below, the prepared fine particle iron was pulverized and blended with the mixture. Specifically, regarding each of Nos. 2 to 4, the fine particle iron was pulverized so as to have a particle diameter of 0.3 mm or less, and then used. Regarding No. 5 listed in Table 10, the fine particle iron was pulverized so as to have a particle diameter of 1.0 mm or less, and then used.

In Table 10, "−X" listed in the "Particle diameter" column indicates a powder that passes through a sieve with X-mm openings when sifting is performed with the sieve.

The resulting green pellets of Nos. 1 to 5 were charged into a dryer and dried by heating at 180° C. for 1 hour to remove water of adhesion. The component compositions of the resulting dry pellets were analyzed. Table 10 lists "Total Fe" (total iron content). Table 10 also lists the apparent density of the resulting dry pellets.

The resulting dry pellets were fed to the heating furnace and heated at 1450° C. to reduce and melt iron oxide in the pellets, thereby producing reduced iron. Nitrogen gas was flowed in the furnace during the heating, so that the furnace was filled with a nitrogen atmosphere.

Table 10 lists the time required for reduction-melting. Note that in Table 10, the time is expressed as "Reaction time".

After the heating, samples including the reduced iron were discharged from the furnace and subjected to sifting. In the sifting, a sieve with 3.35-mm openings was used. The resulting oversieve residues were recovered as a product. The oversieve residues is expressed as "+3.35 mm" in Table 10.

The ratio of the mass of the oversieve residues to the total mass of iron charged into the heating furnace is defined as a yield. The yield is calculated on the basis of the following formula (1). Table 10 lists the calculation results. The oversieve residues contain C, Si, Mn, and so forth in addition to Fe. Thus, the yield may exceed 100%.

$$\text{Yield (\%)} = (\text{mass of oversieve residue when sifting is performed using sieve with 3.35-mm opening}/\text{total mass of iron charged into heating furnace}) \times 100 \quad (1)$$

The component composition of the resulting reduced iron was analyzed. The C content is listed in Table 10.

The productivity index was calculated from the following formula (2) on the basis of the apparent density of the dry pellets, the reaction time, the +3.35 mm yield, and the analytical value of the dry pellets (Total Fe) listed in Table 10. The calculation results are listed in Table 10. Note that the productivity index of No. 1 listed in Table 10 is defined as 1.00.

$$\text{Productivity index} = A \times B \times C \times D \quad (2)$$

where A to D are as follows:

A=(apparent density of dry pellet to which fine particle iron was added)/(apparent density of dry pellet to which fine particle iron was not added)

B=(reaction time in example in which fine particle iron was not added)/(reaction time in example in which fine particle iron was added)

C=(+3.35 mm yield in example in which fine particle iron was added)/(+3.35 mm yield in example in which fine particle iron was not added)

D=(analytical value of Total Fe of dry pellet in example in which fine particle iron was added)/(analytical value of Total Fe of dry pellet in example in which fine particle iron was not added)

The following discussion is drawn from Table 10. No. 1 is a comparative example in which the fine particle iron is not blended and in which the requirements specified in the present invention are not satisfied.

Nos. 2 to 5 are examples in which the fine particle iron formed in the step of producing reduced iron is blended after the particle diameter of the fine particle iron is adjusted and in which the requirements specified in the present invention are satisfied. In each of Nos. 2 to 5 in which the fine particle iron having the adjusted particle diameter is blended, a high productivity index is obtained, compared with No. 1 in which the fine particle iron is not blended. The results demonstrate that the productivity is improved.

Each of Nos. 2 to 4 is an example in which the fine particle iron having a particle diameter of 0.3 mm or less is used. Comparisons of these results demonstrate that at the same particle diameter, a higher blending ratio of the fine particle iron results in an increase in the apparent density of the dry pellets and an increase in the total iron content (Total Fe) of in the dry pellets and that the productivity is improved. Nos. 4 and 5 are examples in which the amount of the fine particle iron blended is fixed to 12%. Comparisons of these results demonstrate that a smaller particle diameter of the fine particle iron blended results in improvement in productivity.

TABLE 2

Component composition of iron ore (% by mass)

| Total Fe | FeO | SiO$_2$ | CaO | Al$_2$O$_3$ | MgO | S |
|---|---|---|---|---|---|---|
| 64.76 | 0.87 | 5.71 | 0.04 | 0.29 | 0.04 | 0.006 |

TABLE 3

Component composition of coal (% by mass)

| Fixed carbon | Volatile component | Ash | Total |
|---|---|---|---|
| 77.51 | 15.77 | 6.72 | 100 |

TABLE 4

Component composition of limestone (% by mass)

| SiO$_2$ | CaO | Al$_2$O$_3$ | MgO | S |
|---|---|---|---|---|
| 0.16 | 54.32 | 0.2 | 0.15 | 0.002 |

TABLE 5

Component composition of dolomite (% by mass)

| SiO$_2$ | CaO | Al$_2$O$_3$ | MgO | S |
|---|---|---|---|---|
| 0.87 | 29.72 | 0.25 | 20.92 | 0.013 |

TABLE 6

Component composition of fluorite (% by mass)

| SiO$_2$ | Total Ca | Al$_2$O$_3$ | MgO | F |
|---|---|---|---|---|
| 1.12 | 49.98 | 0.36 | 0.02 | 47.29 |

TABLE 7

Blending ratio (% by mass)

| Iron ore | Coal | Limestone | Dolomite | Fluorite | Binder | Total |
|---|---|---|---|---|---|---|
| 69.61 | 16.8 | 8.54 | 2.85 | 0.8 | 1.4 | 100 |

TABLE 8

Particle diameter distribution before pulverization

| Particle diameter (mm) | % by mass |
|---|---|
| 1.7-2.36 | 11.4 |
| 1.0-1.7 | 19.8 |
| −1.0 | 68.8 |
| Total | 100 |

TABLE 9

Component composition of fine particle iron (% by mass)

| Total Fe | FeO | Met. Fe | Total C | SiO$_2$ | CaO | Al$_2$O$_3$ | MgO | F |
|---|---|---|---|---|---|---|---|---|
| 69.72 | 0.98 | 68.74 | 2.85 | 10.36 | 11.81 | 2.07 | 1.67 | 0.66 |

TABLE 10

| No. | 1 | 2 | 3 | 4 | 5 |
|---|---|---|---|---|---|
| Amount of fine particle iron blended (% by mass) | 0 | 3 | 6 | 12 | 12 |
| Particle diameter of fine particle iron (mm) | — | −0.3 | −0.3 | −0.3 | −1.0 |
| Analytical value of dry pellet: Total Fe (% by mass) | 42.25 | 45.79 | 46.53 | 47.52 | 47.68 |
| Apparent density of dry pellet (g/cm$^3$) | 2.138 | 2.176 | 2.211 | 2.279 | 2.251 |
| Reaction time (minutes) | 10.00 | 10.05 | 9.60 | 9.93 | 10.52 |
| Reduced iron: +3.35 mm yield (%) | 83.05 | 84.13 | 83.70 | 87.34 | 83.39 |
| Analytical value of reduced iron: C (% by mass) | 3.75 | 3.51 | 3.56 | 3.51 | 3.64 |
| Productivity index (−) | 1.00 | 1.04 | 1.12 | 1.19 | 1.06 |

[Experimental Example 2]

A mixture that contained an iron oxide-containing substance, a carbonaceous reducing agent, a melting point-adjusting agent, and a binder was agglomerated to produce agglomerates. As the iron oxide-containing substance, iron ore having a component composition listed in Table 11 described below was used. In Table 11, "Total Fe" indicates the total iron content. As the carbonaceous reducing agent, coal having a component composition listed in Table 12 described below was used. As the melting point-adjusting agent, limestone having a component composition listed in Table 13 described below, dolomite having a component composition listed in Table 14 described below, and fluorite having a component composition listed in Table 15 described below were used. In Table 15, "Total Ca" indicates the total calcium content.

Regarding No. 11 listed in Table 19 described below, the iron oxide-containing substance (iron ore), the carbonaceous reducing agent (coal), the melting point-adjusting agent (limestone, dolomite, and fluorite), and flour as the binder were blended together in a blending ratio listed in Table 16 described below. An appropriate amount of water was added thereto. Green pellets each having a diameter of 19 mm were produced with a tire-type pelletizer.

Regarding each of Nos. 12 to 15 listed in Table 19, the iron oxide-containing substance (iron ore), the carbonaceous reducing agent (coal), the melting point-adjusting agent (limestone, dolomite, and fluorite), and flour as the binder were blended together in a blending ratio listed in Table 16 described below. The amount of the resulting mixture was defined as 100% by mass. Fine particle iron listed in Table 19 and an appropriate amount of water were added thereto. Green pellets each having an average diameter of 19 mm were produced with a tire-type pelletizer.

The fine particle iron blended with the mixture was as follows: Fine particle iron prepared for blending with the mixture (specifically, fine particle iron formed in the step of producing reduced iron, the fine particle iron being unpulverized) was sifted using a sieve with 2.36-mm openings. A portion of the powder passed through the sieve was collected. The resulting undersieve was sifted using a sieve with 1.7-mm openings and a sieve with 1.0-mm openings, and the particle diameter distribution was determined. Table 17 lists the particle diameter distribution. In Table 17, "−1.0" listed in the "Particle diameter" column indicates a powder that passes through a sieve with 1.0-mm openings when sifting is performed with the sieve.

The component composition of the prepared fine particle iron is listed in Table 18 described below. In Table 18, "Total Fe" indicates the total iron content, "Met. Fe" indicates the metallic iron content, and "Total C" indicates the total carbon content. The prepared fine particle iron had a specific gravity of 4.7 g/cm$^3$.

Regarding No. 12 listed in Table 19, the fine particle iron passed through the sieve with 2.36-mm openings was blended with the mixture. Regarding each of Nos. 13 to 15 listed in Table 19, after the particle diameter of the fine particle iron passed through the sieve with 2.36-mm openings was adjusted by further sifting, the resulting fine particle iron was blended with the mixture. Specifically, regarding No. 13, the fine particle iron whose particle diameter had been adjusted to 0.3 mm or less by sifting was used. Regarding each of Nos. 14 and 15, the fine particle iron whose particle diameter had been adjusted to 1.0 mm or less by sifting was used.

In Table 19, "−X" listed in the "Particle diameter" column indicates a powder that passes through a sieve with X-mm openings when sifting is performed with the sieve.

The resulting green pellets of Nos. 11 to 15 were charged into a dryer and dried by heating at 180° C. for 1 hour to remove water of adhesion. The component compositions of the resulting dry pellets were analyzed. Table 19 lists "Total Fe" (total iron content). Table 19 also lists the apparent density of the resulting dry pellets.

The resulting dry pellets were fed to the heating furnace and heated at 1450° C. to reduce and melt iron oxide in the pellets, thereby producing reduced iron. The furnace was filled with a mixed gas mixture atmosphere of 60% by volume of nitrogen gas and 40% by volume of carbon dioxide gas during the heating.

Table 19 lists the time required for reduction-melting. Note that in Table 19, the time is expressed as "Reaction time".

After the heating, samples including the reduced iron were discharged from the furnace and subjected to sifting. In the sifting, a sieve with 3.35-mm openings was used. The resulting oversieve residues were recovered as a product. The oversieve residues is expressed as "+3.35 mm" in Table 19.

The ratio of the mass of the oversieve residues to the total mass of iron charged into the heating furnace is defined as a yield. The yield is calculated on the basis of the foregoing formula (1). Table 19 lists the calculation results.

The component composition of the resulting reduced iron was analyzed. The C content is listed in Table 19.

The productivity index was calculated from the foregoing formula (2) on the basis of the apparent density of the dry pellets, the reaction time, the +3.35 mm yield, and the analytical value of the dry pellets (Total Fe) listed in Table 19. The calculation results are listed in Table 19. Note that the productivity index of No. 11 listed in Table 19 is defined as 1.00.

The following discussion is drawn from Table 19. No. 11 is a comparative example in which the fine particle iron is not blended and in which the requirements specified in the present invention are not satisfied.

Nos. 12 to 15 are examples in which examples in which the fine particle iron formed in the step of producing reduced iron is blended after the particle diameter of the fine particle iron is adjusted and in which the requirements specified in the present invention are satisfied. In each of Nos. 12 to 15 in which the fine particle iron having the adjusted particle diameter is blended, a high productivity index is obtained, compared with No. 11 in which the fine particle iron is not blended. The results demonstrate that the productivity is improved. Nos. 12 and 13 are examples in which the amount of the fine particle iron blended with the mixture is fixed to 12%. Comparisons of these results demonstrate that a smaller particle diameter of the fine particle iron blended results in improvement in productivity. Each of Nos. 14 and 15 is an example in which the fine particle iron whose particle diameter is adjusted to 1.0 mm or less is blended with the mixture. Comparisons of these results demonstrate that at the same particle diameter, a higher blending ratio of the fine particle iron results in an increase in the apparent density of the dry pellets and an increase in the total iron content (Total Fe) of the dry pellets and that the productivity is improved.

TABLE 11

| Component composition of iron ore (% by mass) | | | | | | |
|---|---|---|---|---|---|---|
| Total Fe | FeO | SiO$_2$ | CaO | Al$_2$O$_3$ | MgO | S |
| 64.87 | 0.97 | 5.22 | 0.03 | 0.37 | 0.02 | 0.002 |

TABLE 12

| Component composition of coal (% by mass) | | | |
|---|---|---|---|
| Fixed carbon | Volatile component | Ash | Total |
| 77.01 | 15.80 | 7.19 | 100 |

TABLE 13

Component composition of limestone (% by mass)

| $SiO_2$ | CaO | $Al_2O_3$ | MgO | S |
|---|---|---|---|---|
| 0.29 | 54.01 | 0.23 | 0.82 | 0.067 |

TABLE 14

Component composition of dolomite (% by mass)

| $SiO_2$ | CaO | $Al_2O_3$ | MgO | S |
|---|---|---|---|---|
| 0.87 | 29.72 | 0.25 | 20.92 | 0.013 |

TABLE 15

Component composition of fluorite (% by mass)

| $SiO_2$ | Total Ca | $Al_2O_3$ | MgO | F |
|---|---|---|---|---|
| 1.12 | 49.98 | 0.36 | 0.02 | 47.29 |

TABLE 16

Blending ratio (% by mass)

| Iron ore | Coal | Limestone | Dolomite | Fluorite | Binder | Total |
|---|---|---|---|---|---|---|
| 68.89 | 17.42 | 7.31 | 4.48 | 0.8 | 1.1 | 100 |

TABLE 17

Particle diameter distribution before pulverization

| Particle diameter (mm) | % by mass |
|---|---|
| 1.7-2.36 | 11.4 |
| 1.0-1.7 | 19.8 |
| −1.0 | 68.8 |
| Total | 100 |

TABLE 18

Component composition of fine particle iron (% by mass)

| Total Fe | FeO | Met. Fe | Total C | $SiO_2$ | CaO | $Al_2O_3$ | MgO | F |
|---|---|---|---|---|---|---|---|---|
| 69.72 | 0.98 | 68.74 | 2.85 | 10.36 | 11.81 | 2.07 | 1.67 | 0.66 |

TABLE 19

| | No. | | | | |
|---|---|---|---|---|---|
| | 11 | 12 | 13 | 14 | 15 |
| Amount of fine particle iron blended (% by mass) | 0 | 12 | 12 | 6 | 3 |
| Particle diameter of fine particle iron (mm) | — | −2.36 | −0.3 | −1.0 | −1.0 |
| Analytical value of dry pellet: Total Fe (% by mass) | 46.15 | 48.81 | 48.84 | 47.48 | 46.84 |
| Apparent density of dry pellet (g/cm³) | 2.159 | 2.237 | 2.288 | 2.296 | 2.244 |
| Reaction time (minutes) | 11.83 | 11.28 | 11.33 | 11.23 | 11.53 |
| Reduced iron: +3.35 mm yield (%) | 94.56 | 94.47 | 95.09 | 97.31 | 96.22 |
| Analytical value of reduced iron: C (% by mass) | 2.51 | 2.84 | 2.49 | 2.47 | 2.61 |
| Productivity index (—) | 1.00 | 1.15 | 1.18 | 1.19 | 1.10 |

The invention claimed is:

1. A method for producing reduced iron, the method comprising:
   agglomerating a mixture comprising an iron oxide-containing substance, a carbonaceous reducing agent, and a melting point-adjusting agent, to form agglomerates;
   heating the agglomerates, reducing and partially melting iron oxide in the agglomerates, and allowing an iron component to coalesce, to produce a reduced iron and a fine particle iron;
   adjusting the particle diameter of the fine particle iron and recycling the fine particle iron into the step of agglomerating by blending the fine particle iron with the mixture and further agglomerating to form agglomerates containing fine particle iron increases the density and iron content of the agglomerates thus increasing the amount of reduced iron formed.

2. The method according to claim 1, wherein the particle diameter of the fine particle is 3 mm or less.

3. The method according to claim 1, comprising selecting a population of the fine particle iron having a reduced particle diameter by sieving of the fine particle iron during said adjusting of the particle diameter.

4. The method according to claim 1, wherein the adjusting of the particle diameter occurs by pulverization and then selecting a population of the fine particle iron having a reduced particle diameter by sieving of the fine particle iron.

5. The method according to claim 1, wherein the adjusting of the particle diameter occurs by pulverization of the fine particle iron.

6. The method according to claim 1, wherein:
   a total iron content (Total Fe) of the fine particle iron is 50% by mass or more; and
   a specific gravity of the fine particle iron is 4 g/cm³ or more.

7. The method according to claim 1, wherein, when a mass of the mixture other than the fine particle iron is defined as 100%, the fine particle iron is blended with the mixture in an amount of 3% by mass or more.

* * * * *